US012761416B2

(12) United States Patent
Kuo

(10) Patent No.: US 12,761,416 B2
(45) Date of Patent: *Oct. 13, 2026

(54) LIGHT-EMITTING ASSEMBLY

(71) Applicant: Innolux Corporation, Miao-Li County (TW)

(72) Inventor: Mark Kuo, Tainan City (TW)

(73) Assignee: Innolux Corporation, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 19/253,472

(22) Filed: Jun. 27, 2025

(65) Prior Publication Data

US 2025/0327966 A1 Oct. 23, 2025

Related U.S. Application Data

(63) Continuation of application No. 18/755,371, filed on Jun. 26, 2024, now Pat. No. 12,366,702, which is a continuation of application No. 18/360,971, filed on Jul. 28, 2023, now Pat. No. 12,050,337, which is a continuation of application No. 17/643,753, filed on Dec. 10, 2021, now Pat. No. 11,754,774, which is a continuation of application No. 17/072,431, filed on Oct. 16, 2020, now Pat. No. 11,231,538.

(51) Int. Cl.

| | |
|---|---|
| ***F21V 8/00*** | (2006.01) |
| ***G02B 1/11*** | (2015.01) |
| ***G02F 1/1333*** | (2006.01) |

(52) U.S. Cl.
CPC ......... *G02B 6/0088* (2013.01); *G02B 6/0036* (2013.01); *G02B 6/0038* (2013.01); *G02B 6/0055* (2013.01); *G02B 1/11* (2013.01); *G02B 6/0051* (2013.01); *G02F 1/1333* (2013.01)

(58) Field of Classification Search
CPC .. G02B 6/0088; G02B 6/0036; G02B 6/0038; G02B 6/0055
See application file for complete search history.

(56) References Cited

U.S. PATENT DOCUMENTS 9,022,631 B2 * 5/2015 Mulder ................ G02B 6/0091 362/601
10,025,023 B2 * 7/2018 You ........................ G02B 6/005
10,078,174 B2 * 9/2018 You ....................... G02B 6/0038
10,591,660 B2 * 3/2020 Vasylyev ............. G02B 6/0065
10,962,701 B2 * 3/2021 Vasylyev ............... G02B 6/005

(Continued)

*Primary Examiner* — Bryon T Gyllstrom

(74) *Attorney, Agent, or Firm* — Patterson + Sheridan, LLP

(57) ABSTRACT

A light-emitting assembly is provided, which has a display area and a non-display area. The light-emitting assembly includes a plurality of reflection-reducing components, a reflective component and a light source. The reflective components are disposed in the non-display area. In a top view, two of the reflection-reducing components are separated by a gap at a corner of the light-emitting assembly. The reflective component is disposed in the display area. The reflective component is disposed between at least one of the reflection-reducing components and the light source in the top-view. The reflection-reducing component includes a first glue layer and a substrate layer disposed on the first glue layer. A ratio of a reflectivity of the reflection-reducing component to a reflectivity of the reflective component is greater than or equal to 3% and less than or equal to 85%.

12 Claims, 7 Drawing Sheets

(56) References Cited

U.S. PATENT DOCUMENTS

2006/0056200 A1* 3/2006 Yamashita ........... G02B 6/4298
362/620
2006/0146573 A1* 7/2006 Iwauchi ............... G02B 6/0043
362/621
2010/0067257 A1* 3/2010 Meis .................... G02B 6/0055
362/624
2014/0104877 A1* 4/2014 An ........................ F21V 7/0025
362/609
2015/0253487 A1* 9/2015 Nichol ................... G02B 6/243
362/610

* cited by examiner

LIGHT-EMITTING ASSEMBLY

CROSS REFERENCE TO RELATED APPLICATIONS

This application is a Continuation of pending U.S. patent application Ser. No. 18/755,371, filed Jun. 26, 2024 and entitled "LIGHT-EMITTING ASSEMBLY", which is a Continuation of pending U.S. patent application Ser. No. 18/360,971, filed Jul. 28, 2023 and entitled "LIGHT-EMITTING ASSEMBLY", which is a Continuation of pending U.S. patent application Ser. No. 17/643,753, filed Dec. 10, 2021 and entitled "BACKLIGHT MODULE WITH REFLECTION-REDUCING COMPONENT AND DISPLAY DEVICE COMPRISING THE SAME", which is a Continuation of pending U.S. patent application Ser. No. 17/072,431, filed Oct. 16, 2020 and entitled "BACKLIGHT MODULE WITH REFLECTION-REDUCING COMPONENT AND DISPLAY DEVICE COMPRISING THE SAME", the entirety of which are incorporated by reference herein.

BACKGROUND

Technical Field

The present disclosure relates to a backlight module and a display device that includes the backlight module, and in particular it relates to a backlight module that has a reflection-reducing component.

Description of the Related Art

Electronic products equipped with display panels have become indispensable necessities in modern society. With the flourishing development of these portable electronic products, consumers have high expectations regarding their quality, functionality, and price.

However, electronic products (such as display devices) have not yet met consumer expectations in various aspects. For example, existing display devices have a light leakage problem, and this can affect the display quality. Moreover, this problem may be particularly serious for display devices having narrow borders. Therefore, the developments of the structural design that can improve the performance of these display devices are needed.

SUMMARY

In accordance with some embodiments of the present disclosure, a light-emitting assembly is provided. The light-emitting assembly has a display area and a non-display area connected to the display area. The light-emitting assembly includes a plurality of reflection-reducing components, a reflective component and a light source. The plurality of reflection-reducing components are disposed in the non-display area. In a top view, two of the plurality of reflection-reducing components are separated by a gap at a corner of the light-emitting assembly. The reflective component is disposed in the display area. The reflective component is disposed between at least one of the plurality of reflection-reducing components and the light source in the top-view. The at least one of the plurality of reflection-reducing components includes a first glue layer and a substrate layer disposed on the first glue layer. Moreover, a ratio of a reflectivity of the at least one of the plurality of reflection-reducing components to a reflectivity of the reflective component is greater than or equal to 3% and less than or equal to 85%.

In accordance with some other embodiments of the present disclosure, a light-emitting assembly is provided. The light-emitting assembly has a display area and a non-display area connected to the display area. The light-emitting assembly includes a reflection-reducing component, a reflective component and a light source. The reflection-reducing component is disposed in the non-display area. The reflective component is disposed in the display area and adjacent to the reflection-reducing component. The reflective component is disposed between the reflection-reducing component and the light source in a top-view. The reflection-reducing component includes a first glue layer and a substrate layer disposed on the first glue layer. Moreover, a reflectivity of the reflection-reducing component is less than or equal to 85%.

In accordance with still some other embodiments of the present disclosure, a light-emitting assembly is provided. The light-emitting assembly has a display area and a non-display area connected to the display area. The light-emitting assembly includes a reflection-reducing component, a reflective component and a light source. The reflection-reducing component is disposed in the non-display area. The reflective component is disposed in the display area and adjacent to the reflection-reducing components. The reflective component is disposed between the reflection-reducing component and the light source in a top-view. The reflection-reducing component includes a first glue layer and a substrate layer disposed on the first glue layer. Moreover, a ratio of a reflectivity of the reflection-reducing component to a reflectivity of the reflective component is greater than or equal to 3% and less than or equal to 85%.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
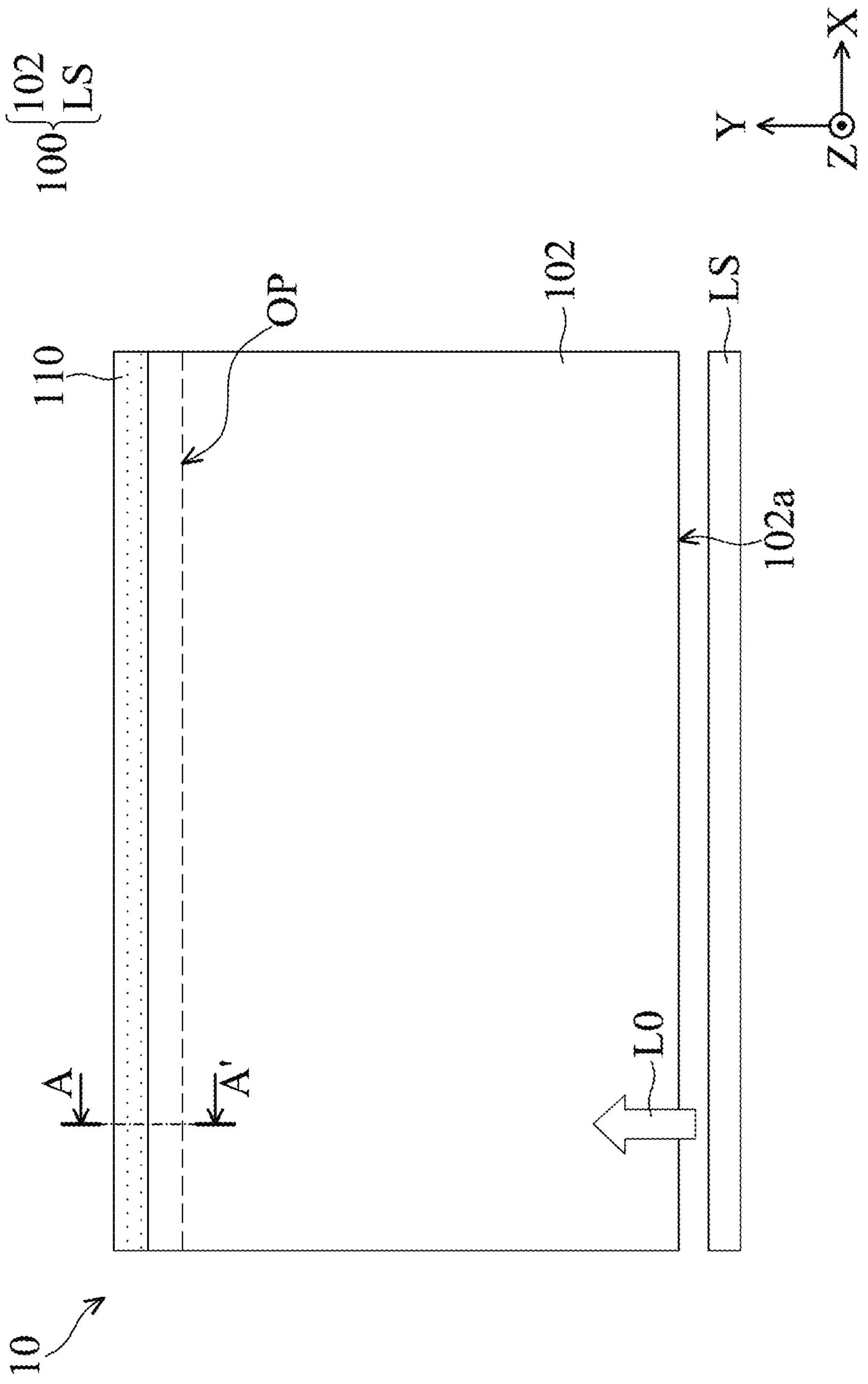
FIG. 1 is a top-view diagram of a display device in accordance with some embodiments of the present disclosure.

The backlight module and the display device of the present disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent that the exemplary embodiments set forth herein are used merely for the purpose of illustration. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be understood that in the embodiments, relative expressions are used. For example, "lower", "bottom", "higher" or "top" are used to describe the position of one element relative to another. It should be appreciated that if a device is flipped upside down, an element that is "lower" will become an element that is "higher". The descriptions of the exemplary embodiments are intended to be read in connection with the accompanying drawings, which are to be considered part of the entire written description. It should be understood that the drawings are not drawn to scale. In addition, structures and devices are shown schematically in order to simplify the drawing.

In addition, it should be understood that, although the terms "first", "second", "third" etc. may be used herein to describe various elements, components, or portions, these elements, components, or portions should not be limited by these terms. These terms are only used to distinguish one element, component, or portion from another element, component, or portion. Thus, a first element, component, or portion discussed below could be termed a second element, component, or portion without departing from the teachings of the present disclosure.

The terms "about", "approximately" and "substantially" typically mean +/−10% of the stated value, or +/−5% of the stated value, or +/−3% of the stated value, or +/−2% of the stated value, or +/−1% of the stated value or +/−0.5% of the stated value. The stated value of the present disclosure is an approximate value. When there is no specific description, the stated value includes the meaning of "about", "approximately", or "substantially". Furthermore, the phrase "in a range from a first value to a second value" or "in a range between a first value and a second value" indicates that the range includes the first value, the second value, and other values between them.

Certain terms are used in the specification and appended claims of the present application to refer to specific elements. Those skilled in the art should understand that electronic device manufacturers may refer to the same element by using different names. The present disclosure does not intend to distinguish between components that have the same function but different names. In the following description and claims, the terms "include" and "comprise" are open-ended words, and thus they should be interpreted as meaning "include but is not limited to . . . ".

In some embodiments of the present disclosure, terms concerning attachments, coupling and the like, such as "connected" and "interconnected", unless otherwise specifically defined, may refer to two structures being in direct contact, or may refer to two structures not being in direct contact and there are other structures between these two structures.

In addition, the following expression "the first element is disposed on the second element" includes the conditions where the first element and the second element are in direct contact, or another element is disposed between the first element and the second element so that they are not in direct contact. The following expression "the second element is disposed between the first element and the third element" includes the conditions that the second elements is in direct contact with the first element and/or the third element, or another element is disposed between the second element and the first element and/or the third element, and the first element and the second element are not in direct contact, or the second element and the third element are not in direct contact.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the present disclosure, a backlight module including a reflection-reducing component is provided. The reflection-reducing component can reduce light leakage problem at the border region of the backlight module. The display quality of the display device can be improved.

Refer to FIG. 1, which is a top-view diagram of a display device 10 in accordance with some embodiments of the present disclosure. It should be understood that only some elements of the display device 10 (some elements of the backlight module 100) are illustrated in FIG. 1 for clarity. In accordance with some embodiments, additional features or elements may be optionally added to the display device 10. In accordance with some embodiments, some features of the display device 10 described below may be optionally replaced or omitted.

In accordance with some embodiments, the display device 10 may include, for example, a liquid-crystal display device, a light-emitting diode display device, such as an inorganic light-emitting diode display device, an organic light-emitting diode (OLED) display device, a mini light-emitting diode (mini LED) display device, a micro light-emitting diode (micro LED) display device, or a quantum dot (QD) light-emitting diode (for example, QLED or QDLED) display device. In accordance with some embodiments, the liquid-crystal display device may include a backlight module. The backlight module may include light-emitting diodes, such as inorganic light-emitting diodes, organic light-emitting diodes (OLEDs), mini light-emitting diodes (mini LEDs), micro light-emitting diode (micro LED) or quantum dot (QD) light-emitting diode (for example, QLED or QDLED), fluorescence, phosphor, another suitable material, or a combination thereof, but it is not limited thereto. The display device 10 may be any arrangement and combination described above. The following description takes a liquid-crystal display device as an example of the display device 10, but the present disclosure is not limited thereto.

As shown in FIG. 1, the display device 10 may include a backlight unit 100. The backlight unit 100 may include a light guide plate 102 and a light source LS adjacent to the light guide plate 102. The light source LS may emit light L0 to a side 102*a* of the light guide plate 102. In addition, the display device 10 may include a reflection-reducing component 110. In accordance with some embodiments, the reflection-reducing component 110 may be disposed adjacent to a side of the light guide plate 102 that is opposite to the side 102*a*. In accordance with some embodiments, the reflection-reducing component 110 may partially overlap with the light guide plate 102, e.g., an overlapping area OP of the reflection-reducing component 110 and the light guide plate 102 as shown in FIG. 1. In accordance with some others embodiments, the reflection-reducing component 110 may not overlap with the light guide plate 102.

Figure 2:
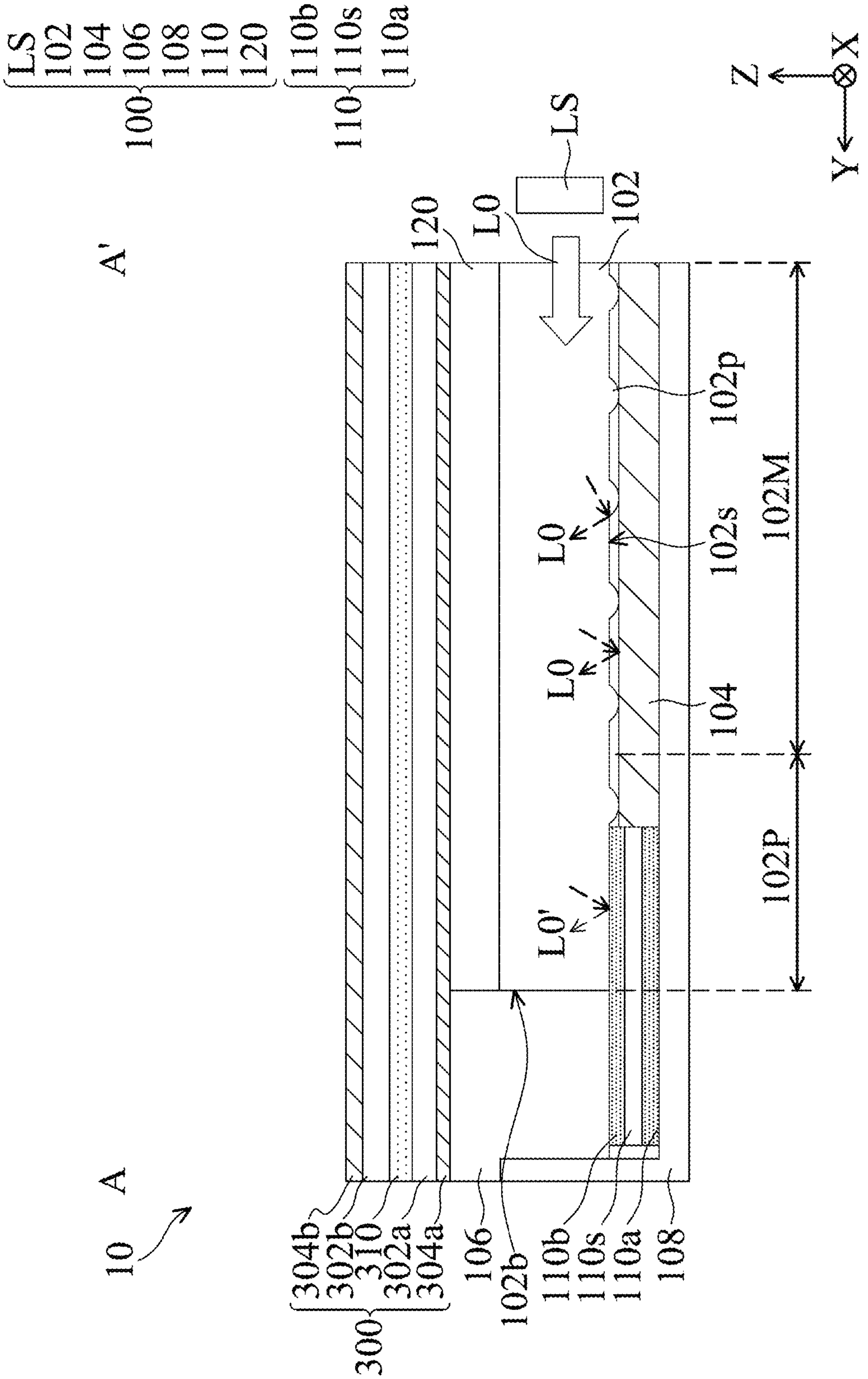
FIG. 2 is a cross-sectional diagram of a display device along line segment A-A' in FIG. 1 in accordance with some embodiments of the present disclosure.

Specifically, refer to FIG. 2 for detailed structure of the display device 10. FIG. 2 is a cross-sectional diagram of the display device 10 along line segment A-A' in FIG. 1 in accordance with some embodiments of the present disclosure. The display device 10 may include a backlight module 100. The backlight module 100 may include the light guide plate 102, a reflective component 104 and the reflection-reducing component 110. In accordance with some embodiments, the light guide plate 102 can guide the light L0 emitted from the light source LS to a display panel 300 of the display device 10. In accordance with some embodiments, the reflective component 104 can be used to reflect the light L0 emitted from the light source LS to the light guide plate 102 or reflect the light L0 escaped from the light guide plate 102 back. In accordance with some embodiments, the reflection-reducing component 110 can reduce the reflection of light, for example, the light L0 may be reduced to the light L0'. In accordance with some embodiments, the reflection-reducing component 110 may be disposed at a side 102*b* of the light guide plate 102 opposite to the side 102*a* to which the light source LS emits the light.

As shown in FIG. 2, the light guide plate 102 may have a surface 102*s* adjacent to the reflective component 104. The surface 102*s* may be a bottom surface of the light guide plate 102. In addition, the surface 102*s* may have a main region 102M and a peripheral region 102P surrounding the main region 102M. The reflective component 104 may be disposed adjacent to the surface 102*s* and corresponding to the main region 102M, but it is not limited thereto. The reflective component 104 may extend to the peripheral region 102P. The reflection-reducing component 110 may be disposed adjacent to the surface 102*s* and corresponding to the peripheral region 102P.

In accordance with the embodiments of the present disclosure, the peripheral region 102P may refer to the area of the surface 102*s* of the light guide plate 102 that is distanced from the side 102*b* of the light guide plate 102 within 5 millimeters (mm), for example, 4 mm, 3 mm, or 2 mm, but it is not limited thereto.

In accordance with some embodiments, the expression "the reflective component 104 is disposed corresponding to the main region 102M" means that the reflective component 104 at least partially overlaps the main region 102M in a normal direction (e.g., the Z direction shown in the drawing) of the light guide plate 102. Similarly, in accordance with some embodiments, the expression "the reflection-reducing component 110 is disposed corresponding to the peripheral region 102P" means that the reflection-reducing component 110 at least partially overlaps the peripheral region 102P in the normal direction (e.g., the Z direction shown in the drawing) of the light guide plate 102.

In accordance with some embodiments, a portion of the reflective component 104 may overlap the peripheral region 102P in the normal direction (e.g., the Z direction shown in the drawing) of the light guide plate 102.

In accordance with some embodiments, the light guide plate 102 may include dots 102*p* formed on the surface 102*s*. In some examples, the dots 102*p* may protrude outward from the surface 102*s*. As shown in FIG. 2, the dots 102*p* may alter the transmitting angle of the light (illustrated by the dotted line segments) to reduce total reflection of the light. In accordance with some embodiments, the material of the light guide plate 102 may include, but is not limited to, glass, polymethylmethacrylate (PMMA), cycloolefin polymer (COP), Polycarbonate (PC), any other suitable material, or a combination thereof.

In accordance with some embodiments, the reflective component 104 may be in contact with the dots 102*p* of the light guide plate 102 and an air gap may exist between the light guide plate 102 and the reflective component 104. In accordance with some embodiments, the material of the reflective component 104 may include a material with a high reflectivity, for example, a material with a reflectivity greater than 85%, for example, greater than 85% and less than 100% (i.e. 85%<reflectivity<100%), but it is not limited thereto. In some embodiments, the material of the reflective component 104 may include, but is not limited to, metal, white ink, white tape, other suitable reflective materials or a combination thereof.

In accordance with some embodiments, the reflection-reducing component 110 may be in contact with the light guide plate 102, but it is not limited thereto. In accordance with some embodiments, the surface 102 of the light guide plate 102 may be adhered to the reflection-reducing component 110. In accordance with some embodiments, the reflection-reducing component 110 may be in contact with the reflective component 104.

In addition, as shown in FIG. 2, the reflection-reducing component 110 may include a first glue layer 110*a* and a substrate layer 110*s* disposed on the first glue layer 110*a* in accordance with some embodiments. In accordance with some embodiments, the reflection-reducing component 110 may further include a second glue layer 110*b*, and the substrate layer 110*s* may be disposed between the first glue layer 110*a* and the second glue layer 110*b*. In other words, the reflection-reducing component 110 may not include the second glue layer 110*b* in accordance with some embodiments. In accordance with some embodiments, the second glue layer 110*b* or the substrate layer 110*s* may be in contact with the light guide plate 102.

In accordance with some embodiments, the first glue layer 110*a* and the second glue layer 110*b* may include, but is not limited to, a photo-curable adhesive, a thermal-curable adhesive, a photo-thermal-curable adhesive, a moisture-curable adhesive, a tape, other suitable materials or a combination thereof. In some embodiments, the first glue layer 110*a* and the second glue layer 110*b* may include, but is not limited to, optical clear adhesive (OCA), optical clear resin (OCR), other suitable materials or a combination thereof. In accordance with some embodiments, the material of the substrate layer 110*s* may include paint, metal, resin, other suitable materials, or a combination thereof, but it is not limited thereto. In accordance with some embodiments, the color of the substrate layer 110*s* may include, but is not limited to, black, white, grey, silver, transparent, or a combination thereof. In accordance with some embodiments, the processes of forming the substrate layer 110*s* may include, but is not limited to, a coating process, a printing process or a combination thereof. It addition, it should be noted that the reflectivity of the reflection-reducing component 110 is less than the reflectivity of the reflective component 104. Specifically, the reflectivity of the reflection-reducing component 110 may be less than or equal to 85% (i.e. reflectivity≤85%) in accordance with some embodiments. As shown in FIG. 2, the light (illustrated by the dotted line segments) reflected by the reflection-reducing component 110 may be reduced. Therefore, the light leakage in the peripheral region 102P may be reduced.

Specifically, in accordance with some embodiments, a ratio of the reflectivity of the reflection-reducing component 110 to the reflectivity of the reflective component 104 may be greater than or equal to 3% and less than or equal to 85% (3%≤the ratio of the reflectivity of the reflection-reducing component to the reflectivity of the reflective component≤85%), or greater than or equal to 5% and less than or equal to 80%, or greater than or equal to 5% and less than or equal to 60%, such as 5%, 8%, 10%, 20%, 30%, 40%, 50%, 60%, or 70%, but it is not limited thereto.

In accordance with the embodiments of the present disclosure, the "reflectivity" may refer to the percentage of the intensity of the light reflected by the light source divided by the intensity of the incident light from the light source (for example, including ambient light, e.g., the light emitted by a measuring instrument). In accordance with the embodiments of the present disclosure, the "light intensity" may refer to the spectrum integral value of the light. For example, the light source may include visible light (e.g., a wavelength between 380 nm and 780 nm or a wavelength between 400 nm to 700 nm), but it is not limited thereto.

It should be understood that, in accordance with the embodiments of the present disclosure, the reflectivity of the reflection-reducing component 110 is measured when it is disposed on the frame 108 and after the second glue layer 110*b* is removed (if the reflection-reducing component 110 includes the second glue layer 110*b*). In accordance with the embodiments of the present disclosure, the reflectivity of the reflective component 104 may be measured when it is disposed on the frame 108 and after removing the housing component 106 and the light guide plate 102.

In accordance with some embodiments, the reflectivity of the reflection-reducing component 110 or the reflective component 104 can be measured using a spectrophotometer (e.g., CM-508d) or other instruments that can measure reflectivity. In addition, the reflectivity is obtained with Specular Component Included (SCI) measurement mode, which includes the measurement of both the specular and diffused reflected light.

In accordance with some embodiments, the reflectivity of the reflection-reducing component 110 and the reflective component 104 measured according to the content described above is shown in Table 1. Examples 1-4 show the reflectivity of the reflection-reducing components 110 that include a white substrate layer, a silver substrate layer, a transparent substrate layer and a black substrate layer, respectively. Example 5 shows the reflectivity of the reflective component 104.

TABLE 1

| | Example 1 | Example 2 | Example 3 | Example 4 | Example 5 |
|---|---|---|---|---|---|
| Reflectivity (%) SCI mode | 77 | 79 | 62 | 5.8 | 98 |

It should be noted that if the ratio of the reflectivity of the reflection-reducing component 110 to the reflectivity of the reflective component 104 is too large (e.g., greater than 85%), the reflectivity difference between the reflection-reducing component 110 and the reflective component 104 is so small that the effect of reducing light leakage may be not obvious. On the other hand, if the ratio of the reflectivity of the reflection-reducing component 110 to the reflectivity of the reflective component 104 is too small (e.g., smaller than 3%), the border region of the display may present dark band in a light state.

Refer to FIG. 2, in accordance with some embodiments, the display device 10 may further include a housing component 106 disposed adjacent to the light guide plate 102 and on the reflective component 104. In accordance with some embodiments, the housing component 106 may be in contact with the light guide plate 102 and/or the reflective component 104. In accordance with some embodiments, the housing component 106 can be used to carry the display panel 300 disposed above, and the housing component 106 can serve as a structural element for fixing the components (e.g., the light guide plate 102) of the backlight module 100.

In accordance with some embodiments, "adjacent to" may be one element nearby or close to another element. The following expression "the first element is disposed adjacent to the second element" may include the conditions where the first element is close to and in direct contact with the second element, the first element is close to and not in direct contact with the second element, or there is no intervening element between the first element and the second element.

In accordance with some embodiments, the housing component 106 may include, but is not limited to, an insulating material, a buffer material, a protective material, an adhesive material, other suitable materials or a combination thereof.

In accordance with some embodiments, the display device 10 may further include a frame 108 and an optical film layer 120. The reflection-reducing component 110 and the reflective component 104 may be disposed on the frame 108. In accordance with some embodiments, the housing component 106 may be disposed on the frame 108. In accordance with some embodiments, the optical film 120 may be disposed between the light guide plate 102 and the display panel 300, and the optical film layer 120 may include one or more optical films.

In accordance with some embodiments, the material of the frame 108 may include, but is not limited to, metal, plastic, ceramic, other suitable materials, or a combination thereof. In accordance with some embodiments, the optical film layer 120 may include a reflective film, a diffusion film, a light intensity enhancement film, an inverted prism film, a dual light intensity enhancement film, other suitable optical films, or a combination thereof, but it is not limited thereto.

In addition, as described above, the display device 10 may include the display panel 300, and the display panel 300 may be disposed on the backlight module 100. In accordance with some embodiments, the display panel 300 may include a first substrate 302*a*, a second substrate 302*b*, and a display medium layer 310 disposed between the first substrate 302*a* and the second substrate 302*b*.

In accordance with some embodiments, the materials of the first substrate 302*a* and the second substrate 302*b* may include, but are not limited to, glass, quartz, sapphire, ceramic, polyimide (PI), liquid-crystal polymer (LCP) material, polycarbonate (PC), polyethylene terephthalate (PET), another suitable material, or a combination thereof. In accordance with some embodiments, the first substrate 302*a* and/or the second substrate 302*b* may include a printed circuit board (PCB). In addition, the material of the first substrate 302*a* may be the same as or different from that of the second substrate 302*b*.

In accordance with some embodiments, the material of the display medium layer 310 may include, but is not limited to, nematic liquid-crystal, smectic liquid-crystal, blue phase liquid-crystal, cholesteric liquid-crystal, other suitable display materials or a combination thereof.

Moreover, in accordance with some embodiments, the display panel 300 may further include a first polarizing plate 304*a* and a second polarizing plate 304*b*. The first polarizing plate 304*a* and the second polarizing plate 304*b* may be disposed on the first substrate 302*a* and the second substrate layer 302*b* respectively.

In accordance with some embodiments, the materials of the first polarizing plate 304*a* and the second polarizing plate 304*b* may include polyvinyl alcohol (PVA), or another suitable material, but is not limited thereto. For example, in accordance with some embodiments, the first polarizing plate 304*a* and the second polarizing plate 304*b* may include two protective layers and a polyvinyl alcohol film interposed between the protective layers. For example, the protective layer may include triacetyl cellulose (TAC) membrane, but it is not limited thereto.

It should be understood that in accordance with various embodiments, the display panel 300 may further include, but is not limited to, an alignment layer, a light-shielding layer, a color filter, a spacer component, a driving element, or a combination thereof according to needs.

Figure 3:
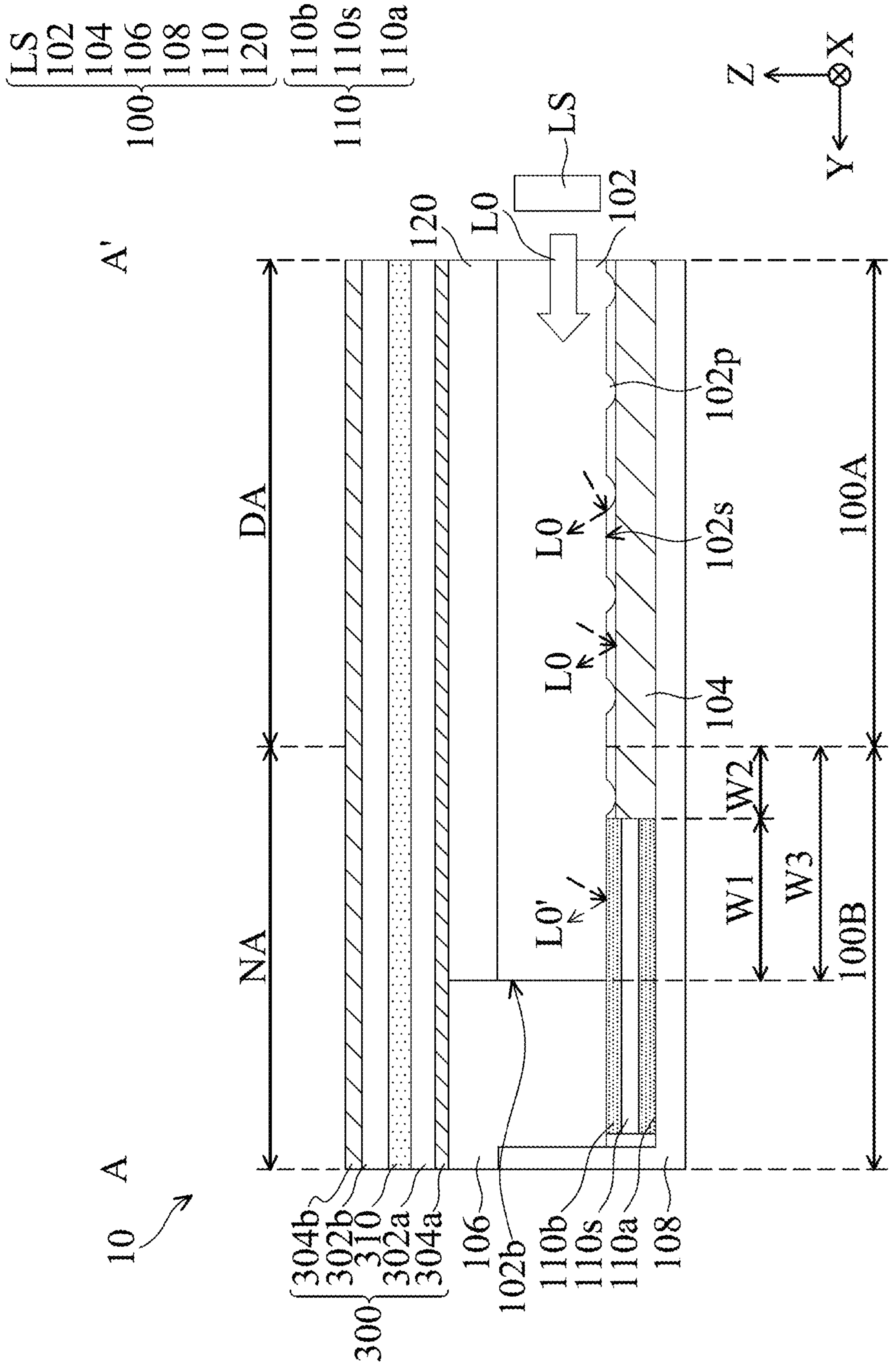
FIG. 3 is a cross-sectional diagram of a display device along line segment A-A' in FIG. 1 in accordance with some embodiments of the present disclosure.

Next, refer to FIG. 3, which is a cross-sectional diagram of the display device along line segment A-A' in FIG. 1 in accordance with some other embodiments of the present disclosure. In addition, the same or similar components (or elements) in the following paragraph will be denoted by the same or similar reference numbers, and their materials, manufacturing methods and functions are the same or similar to those described above, and thus they will not be repeated in the following context.

As shown in FIG. 3, in accordance with some embodiments, the backlight module 100 may include an active region 100A and a border region 100B surrounding the active region 100A. In accordance with some embodiments, the active region 100A and the border region 100B may substantially correspond to a display area DA and a non-display area NA of the display device 10. In accordance with some embodiments, the reflection-reducing component 110 may be disposed in the border region 100B and the reflective component 104 may be disposed in the active region 100A. In accordance with some embodiments, the reflection-reducing component 110 may not extend to the active region 100A. In accordance with some embodiments, a portion of the reflective component 104 may be disposed in the border region 100B. In addition, in accordance with some embodiments, "A corresponds to B" may be regarded as the projection area of A region partially or wholly overlapping the projection area of B region in the same direction. For example, the active region 100A substantially corresponding to a display area DA may be regarded as the projection area of the active region 100A substantially overlapping the projection area of the display area DA in the Z direction.

In accordance with some embodiments, one portion of the reflection-reducing component 110 that is disposed adjacent to the reflective component 104 and partially overlaps with the light guide plate 102 in the border region 100B has a first width W1. Another portion of the reflection-reducing component 110 overlaps with the housing component 106 in the Z direction. The one portion of the reflection-reducing component 100 is disposed between the another portion of the reflection-reducing component 110 and the reflective component 104. In accordance with some embodiments, the reflective component 104 in the border region 100B has a second width of W2. In accordance with some embodiments, the first width W1 may be greater than or equal to the second width W2. Furthermore, in accordance with some embodiments, a ratio of the second width W2 to the first width W1 may be in a range from 1:1 to 1:2 (1:1≤ratio≤1:2), such as 1:1.25, 1:1.5 or 1:1.75, but it is not limited thereto.

In accordance with some embodiments, the first width W1 may refer to the maximum distance of a portion of the reflection-reducing component 110 which is disposed adjacent to the reflective component 104 and partially overlaps with the light guide plate 102 along a direction (e.g., the Y direction in the drawing) that is perpendicular to an extending direction of the reflective component 104. In accordance with some embodiments, the second width W2 may refer to the maximum distance of the reflective component 104 in the border region 100B along a direction (e.g., the Y direction in the drawing) that is perpendicular to the extending direction of the reflective component 104. In addition, the first width W1 and the second width W2 are measured along the same line segment.

In accordance with some embodiments, the first width W1 may refer to the maximum distance of a portion of the reflection-reducing component 110 which is disposed adjacent to the reflective component 104 and partially overlaps with the light guide plate 102 along a direction (e.g., the X direction in the drawing) that is perpendicular to a normal direction of the light emitting surface of the light source LS (e.g., the direction of emit light L0 in the drawing). In accordance with some embodiments, the second width W2 may refer to the maximum distance of the reflective component 104 in the border region 100B along a direction (e.g., the X direction in the drawing) that is perpendicular to a normal direction of the light emitting surface of the light source LS (e.g., the direction of emit light L0 in the drawing).

In addition, in accordance with the embodiments of the present disclosure, "the extending direction" of an object refers to a direction along, or substantially parallel to, the long axis of the object. For example, the object can be encircled by a minimum rectangle, and the extending direction of the long side of the minimum rectangle is the direction of the long axis.

As described above, the display device 10 may include the display area DA and the non-display area NA, and the reflection-reducing component 110 may be disposed corresponding to the non-display area NA in accordance with some embodiments. In accordance with some embodiments, a portion of the light guide plate 102 may be disposed corresponding to the non-display area NA. In addition, in accordance with some embodiments, a ratio of the first width W1 of the reflection-reducing component 110 overlapping the light guide plate 102 to a third width W3 of the light guide plate 102 disposed corresponding to the non-display area NA may be in a range from 1:1.5 to 1:3 (1:1.5≤ratio≤1:3), such as 1:2, 1:2.3 or 1:2.5, but it is not limited thereto.

In accordance with some embodiments, the third width W3 refers to the maximum distance of the light guide plate 102 in the non-display area NA along a direction (e.g., the Y direction in the drawing) that is perpendicular to the extending direction of the reflective component 104. In addition, the third width W3 may be substantially equal to the sum of the first width W1 and the second width W2.

In accordance with some embodiments, the third width W3 refers to the maximum distance of the light guide plate 102 in the non-display area NA along a direction (e.g., the X direction in the drawing) that is perpendicular to the normal direction of the light emitting surface of the light source LS. In addition, in accordance with some embodiments, the peripheral region 102P of the light guide plate 102 may be disposed in the non-display area NA.

In accordance with the embodiments of the present disclosure, the width and the length of the component can be measured from an optical microscope image, and the thickness of the component can be measured from a cross-sectional image in an electron microscope, but it is not limited thereto. In accordance with some embodiments, an optical microscopy (OM), a scanning electron microscope (SEM), a film thickness profiler (α-step), an ellipsometer or another suitable method may be used to measure the width, length, thickness of each element or the distance between elements. Specifically, in accordance with some embodiments, a scanning electron microscope can be used to obtain any cross-sectional image including the elements to be measured, and the width, length, thickness or distance between the elements in the image can be measured.

Figure 4:
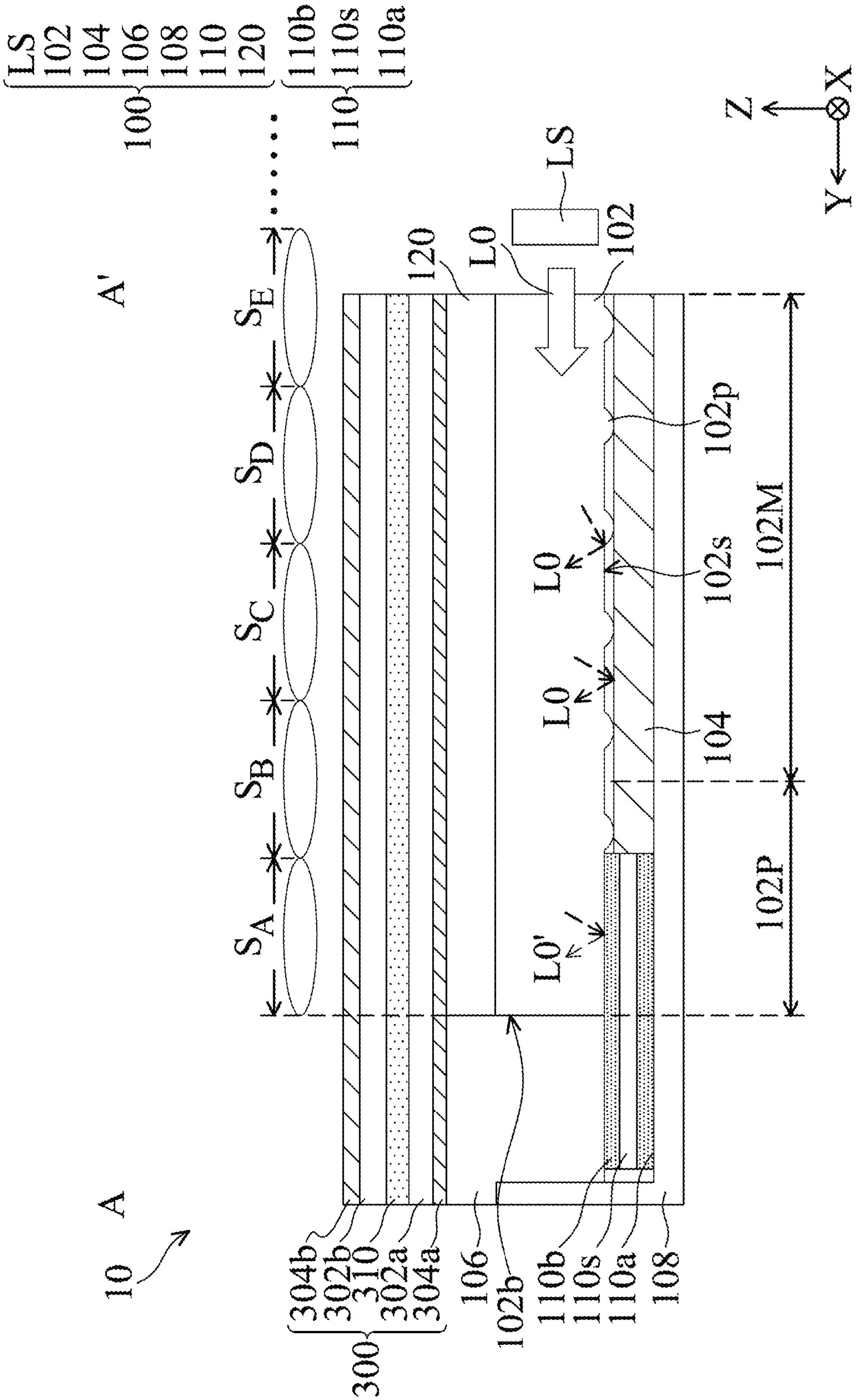
FIG. 4 is a schematic diagram showing measurement of light intensity of a display device in accordance with some embodiments of the present disclosure.

Next, refer to FIG. 4, which is a schematic diagram showing measurement of light intensity of a display device in accordance with some embodiments of the present disclosure. It should be understood that in accordance with the embodiments of the present disclosure, the light intensity of the display device (or the backlight module) can be measured when the display panel 300 and the housing component 106 are removed. In accordance with the embodiments of the present disclosure, the light intensity of the display device is measured when the light guide plate 102, reflective component 104 and reflection-reducing component 110 are disposed on the frame 108.

In accordance with some embodiments, the light intensity of the display device or the backlight module can be measured using a spectroradiometer (e.g., CS-1000) or other instruments that can measure light intensity. In addition, the light intensity can be measured in the unit of nits or cd/$m^2$. The light intensity of the light source can be measured as the luminous intensity per unit area of light travelling in a given direction. It describes the amount of light that passes through, or is reflected from a particular area, and falls within a given solid angle. The light source may include, for example, ambient light or display light, but it is not limited thereto.

In accordance with some embodiments, the light intensity of the areas (for example, the spot $S_A$, the spot $S_B$, the spot $S_C$, the spot $S_D$ and the spot $S_E$ etc.) near the boundary of the active region 100A and border region 100B can be measured. The spot $S_A$ is closest to the side 102*b* (i.e. the edge) of the light guide plate 102, and the spot $S_B$, spot $S_C$, spot $S_D$ and spot $S_E$ are sequentially arranged next to the spot $S_A$.

In accordance with some embodiments, the width of the spot $S_A$, the spot $S_B$, the spot $S_C$, the spot $S_D$ and the spot $S_E$ can be adjusted according to the resolution of the spectroradiometer. In accordance with some embodiments, the width of the spot $S_A$, the spot $S_B$, the spot $S_C$, the spot $S_D$ and the spot $S_E$ may be 3 millimeters. Specifically, the width of the spot $S_A$ may be measured starting from the side 102*b* (i.e. the edge) of the light guide plate 102.

Figure 5:
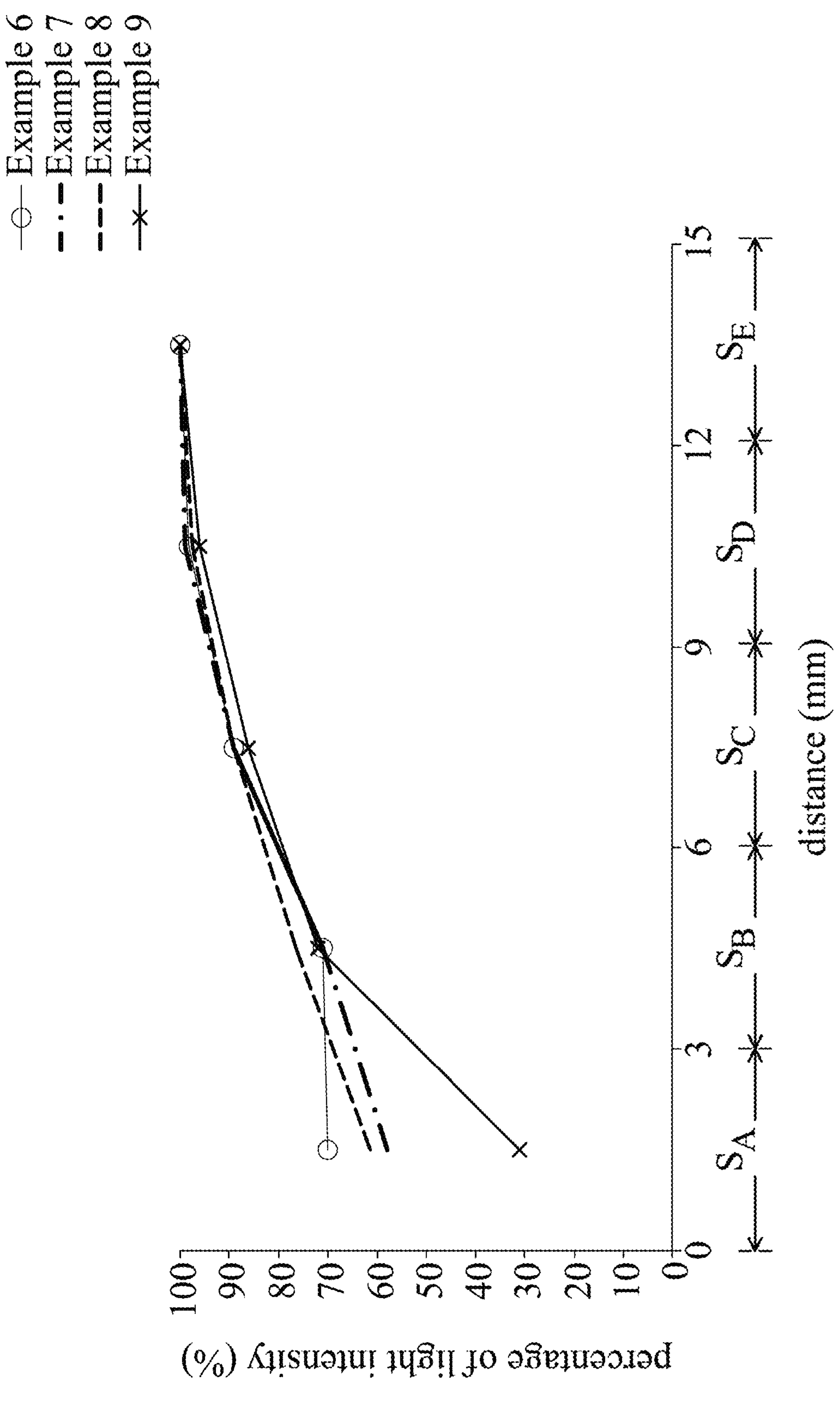
FIG. 5 is a schematic diagram showing the result of measurement of light intensity of a display device in accordance with some embodiments of the present disclosure

In accordance with some embodiments, the light intensity of the spots $S_A$-$S_E$ can be measured according to the content described above. In addition, the percentage of the light intensity of the spots $S_A$ (the spots $S_B$, the spots $S_C$ or the spots $S_D$) to the light intensity of the spot $S_E$ (i.e. light intensity percentage of $S_A/S_E$, $S_B/S_E$, $S_C/S_E$, and $S_D/S_E$) can be obtained (the light intensity of spot $S_E$ serves as a basis, i.e. 100%), and the result is shown in Table 2 and FIG. 5. Examples 6-9 show the percentage of light intensity of the display device that include a white substrate layer, a silver substrate layer, a transparent substrate layer and a black substrate layer as the reflection-reducing component 110, respectively.

TABLE 2

| Percentage of light intensity (%) | Example 6 | Example 7 | Example 8 | Example 9 |
|---|---|---|---|---|
| spot $S_A$ | 70 | 58 | 62 | 31 |
| spot $S_B$ | 72 | 72 | 76 | 73 |
| spot $S_C$ | 89 | 89 | 89 | 86 |
| spot $S_D$ | 97 | 97 | 96 | 94 |
| spot $S_E$ | 100 | 100 | 100 | 100 |

In accordance with some embodiments, a ratio of light intensity in the border region 100B to the light intensity of the active region 100A may be greater than or equal to 20% and less than or equal to 80% (i.e. 20%≤the ratio of light intensity in the border region to light intensity in the active region≤80%), or greater than or equal to 30% and less than or equal to 70%. In accordance with some embodiments, the light intensity in the border region 100B may refer to the light intensity obtained from the spot $S_A$, and the light intensity in the active region 100A may refer to the light intensity obtained from the spot $S_E$.

As described above, the active region 100A and the border region 100B may substantially correspond to the display area DA and the non-display area NA of the display device 10. In other words, in accordance with some embodiments, a ratio of light intensity of the backlight module 100 corresponding to the non-display area NA to light intensity of the backlight module 100 corresponding to the display area DA may be greater than or equal to 20% and less than or equal to 80% (i.e. 20%≤the ratio of light intensity of the backlight module corresponding to the non-display area to light intensity of the backlight module corresponding to the display area≤80%), or greater than or equal to 30% and less than or equal to 70%, but it is not limited thereto.

Figure 6:
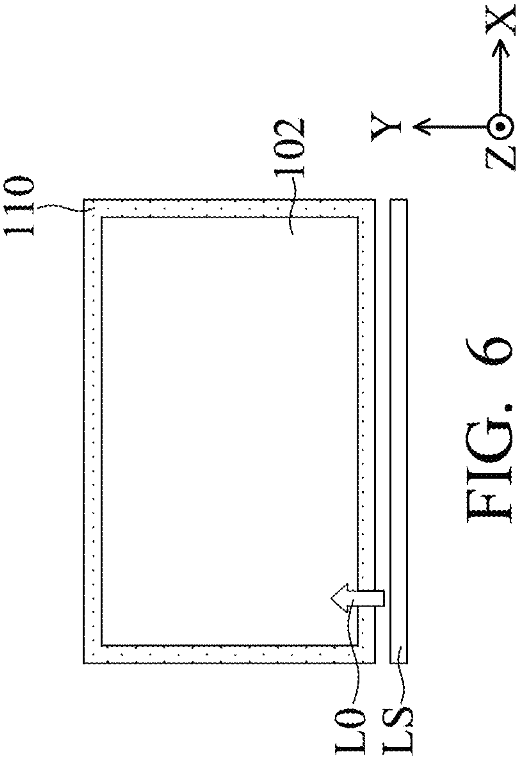
FIG. 6 is a top-view diagram of a display device in accordance with some embodiments of the present disclosure.
Figure 7:
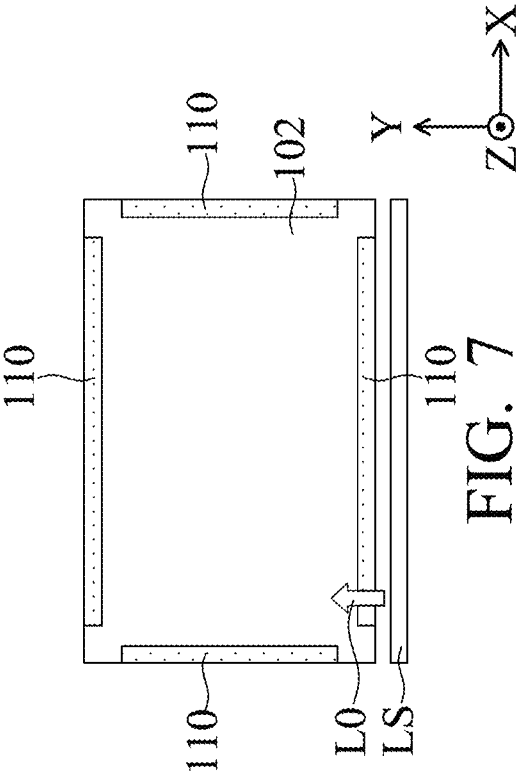
FIG. 7 is a top-view diagram of a display device in accordance with some embodiments of the present disclosure.
Figure 8:
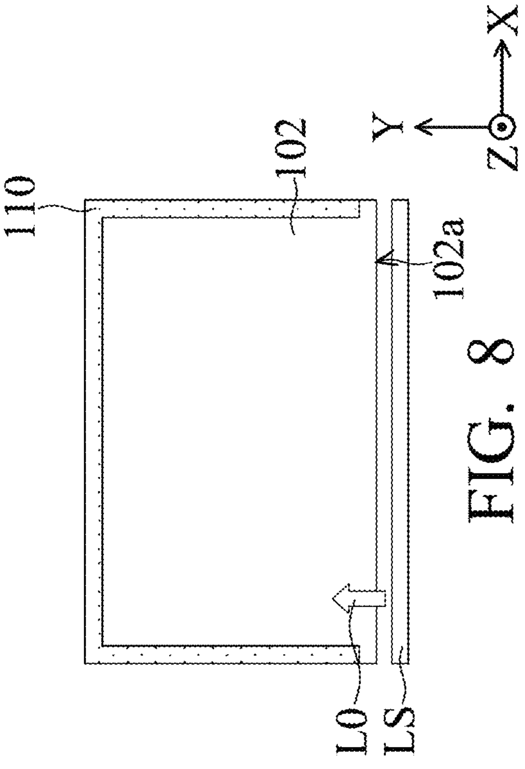
FIG. 8 is a top-view diagram of a display device in accordance with some embodiments of the present disclosure.

Next, refer to FIGS. 6 to 8, which are top-view diagrams of a display device in accordance with some embodiments of the present disclosure. It should be understood that only the light guide plate 10, the reflection-reducing component 110, and the light source LS of the display device are illustrated in FIG. 1 for clarity. As shown in FIG. 6, the reflection-reducing component 110 may be disposed along all sides of the light guide plate 102. In accordance with some embodiments, the reflection-reducing component 110 may be continuously disposed adjacent to all the four sides of the light guide plate 102, but it is not limited thereto.

In addition, as shown in FIG. 7, in accordance with some other embodiments, the reflection-reducing component 110 may be discontinuous. The reflection-reducing component 110 may be discontinuously disposed along at least one side of the light guide plate 102. For example, in accordance with some embodiments, the reflection-reducing component 110 may be discontinuously disposed along two sides, three sides, or four sides of the light guide plate 102.

Moreover, as shown in FIG. 8, in accordance with some other embodiments, the reflection-reducing component 110 may be disposed along the sides of the light guide plate 102 except the side 102*a* that is nearest to the light source LS. In other words, in accordance with some other embodiments, the reflection-reducing component 110 is not disposed along the side 102*a* that is nearest to the light source LS.

Figure 9:
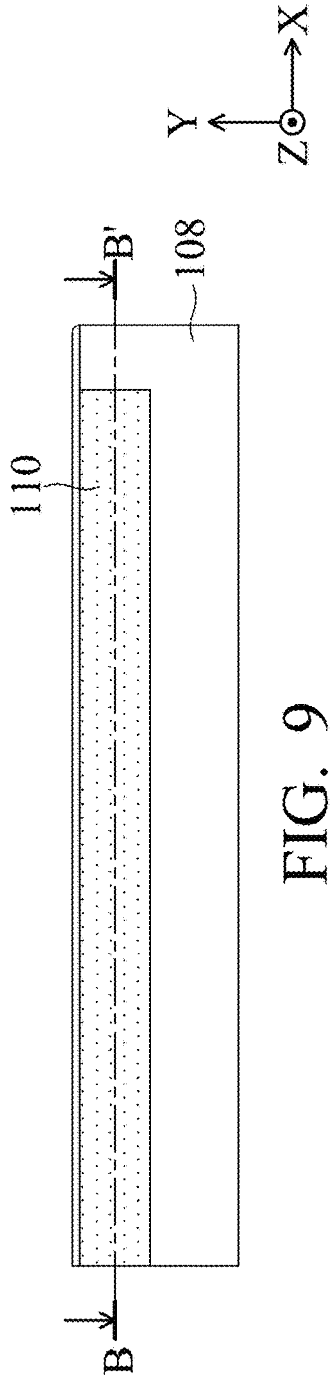
FIG. 9 is a top-view diagram of a portion of a display device in accordance with some embodiments of the present disclosure.

Next, refer to FIG. 9, which is a top-view diagram of a portion of a display device in accordance with some embodiments of the present disclosure. Specifically, FIG. 9 illustrates a partial structure of the reflection-reducing component 110 disposed on the frame 108 near the edge area of the frame 108. As shown in FIG. 9, the reflection-reducing component 110 may be disposed along the edge area of the frame 108.

Figure 11:
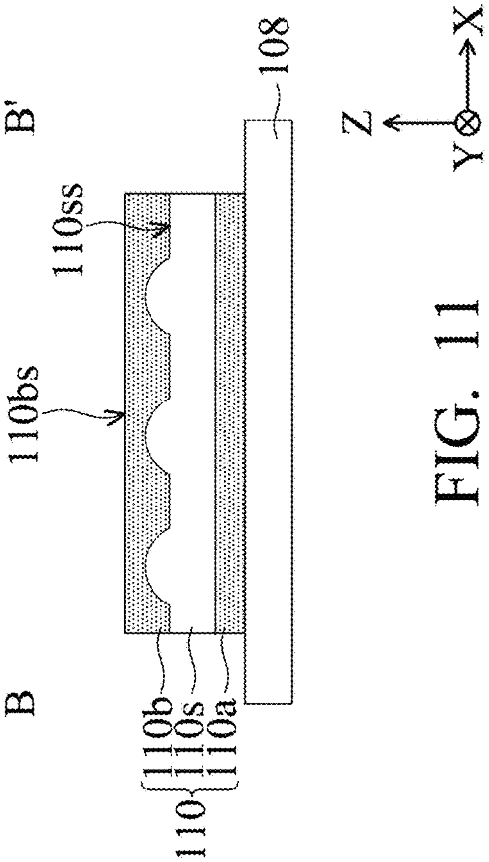
FIG. 11 is a cross-sectional diagram of a portion of a display device along line segment B-B' in FIG. 9 in accordance with some embodiments of the present disclosure.
Figure 10:
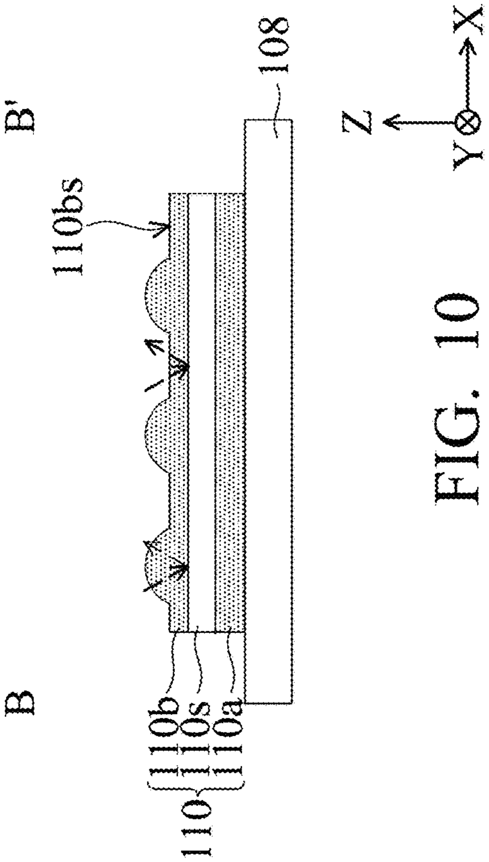
FIG. 10 is a cross-sectional diagram of a portion of a display device along line segment B-B' in FIG. 9 in accordance with some embodiments of the present disclosure.

Refer to FIG. 10 and FIG. 11, which are cross-sectional diagrams of a portion of the display device along line segment B-B' in FIG. 9 in accordance with some embodiments of the present disclosure. As described above, in accordance with some embodiments, the reflection-reducing component 110 may include the substrate layer 110*s*, the first glue layer 110*a* and the second glue layer 110*b*, and the substrate layer 110*s* may be disposed between the first glue layer 110*a* and the second glue layer 110*b*.

As shown in FIG. 10, in accordance with some embodiments, the second glue layer 110*b* may be patterned. Specifically, in accordance with some embodiments, a top surface 110*bs* of the reflection-reducing component 110 that is adjacent to the light guide plate 102 (e.g., as shown in FIG. 2) may be patterned.

As shown in FIG. 11, in accordance with some other embodiments, the substrate layer 110*s* may be patterned. Specifically, in accordance with some embodiments, a top surface 110*ss* of the substrate layer 110*s* that is in contact with the second glue layer 110*b* may be patterned. In accordance with some embodiments, the top surface 110*bs* of the second glue layer 110*b* may be substantially planar. In accordance with some embodiments, the patterned second glue layer 110*b* or substrate layer 110*s* may adjust the intensity of reflection light.

To summarize, in accordance with some embodiments of the present disclosure, the provided backlight module includes the reflection-reducing component. The reflection-reducing component can reduce light leakage problem at the border region of the backlight module. The display quality of the display device can be improved.

Although some embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes an individual embodiment, and the claimed scope of the present disclosure also includes the combinations of the claims and embodiments. The features of the various embodiments can be used in any combination as long as they do not depart from the spirit and scope of the present disclosure. The scope of protection of present disclosure is subject to the definition of the scope of the appended claims.

What is claimed is:

1. A light-emitting assembly having a display area and a non-display area connected to the display area, and comprising:

a plurality of reflection-reducing components disposed in the non-display area, wherein in a top view, two of the plurality of reflection-reducing components are respectively disposed on two adjacent sides of a corner of the light-emitting assembly, and are separated by a gap;

a reflective component disposed in the display area; and a light source, wherein the reflective component is disposed between at least one of the plurality of reflection-reducing components and the light source in the top-view, wherein the at least one of the plurality of reflection-reducing components comprises a first glue layer and a substrate layer disposed on the first glue layer, and wherein a ratio of a reflectivity of the at least one of the plurality of reflection-reducing components to a reflectivity of the reflective component is greater than or equal to 3% and less than or equal to 85%.

2. The light-emitting assembly as claimed in claim 1, wherein at least a part of the first glue layer contacts the reflective component.

3. The light-emitting assembly as claimed in claim 1, further comprising a light guide plate, wherein the at least one of the plurality of reflection-reducing components partially overlaps the light guide plate.

4. The light-emitting assembly as claimed in claim 1, wherein the reflectivity of the at least one of the plurality of reflection-reducing components is less than 85%.

5. The light-emitting assembly as claimed in claim 4, wherein the ratio of the reflectivity of the at least one of the plurality of reflection-reducing components to the reflectivity of the reflective component is greater than or equal to 3% and less than or equal to 80%.

6. A light-emitting assembly having a display area and a non-display area connected to the display area, and comprising:

a reflection-reducing component disposed in the non-display area;

a reflective component disposed in the display area and adjacent to the reflection-reducing component; and a light source, wherein the reflective component is disposed between the reflection-reducing component and the light source in a top-view, wherein the reflection-reducing component comprises a first glue layer and a substrate layer disposed on the first glue layer, and wherein a reflectivity of the reflection-reducing component is less than or equal to 85%.

7. The light-emitting assembly as claimed in claim 6, wherein at least a part of the first glue layer contacts the reflective component.

8. The light-emitting assembly as claimed in claim 6, further comprising a light guide plate, wherein the reflection-reducing component partially overlaps the light guide plate.

9. A light-emitting assembly having a display area and a non-display area connected to the display area, and comprising:

a reflection-reducing component disposed in the non-display area;

a reflective component disposed in the display area and adjacent to the reflection-reducing component; and a light source, wherein the reflective component is disposed between the reflection-reducing component and the light source in a top-view, wherein the reflection-reducing component comprises a first glue layer and a substrate layer disposed on the first glue layer, and wherein a ratio of a reflectivity of the reflection-reducing component to a reflectivity of the reflective component is greater than or equal to 3% and less than or equal to 85%.

10. The light-emitting assembly as claimed in claim 9, wherein at least a part of the first glue layer contacts the reflective component.

11. The light-emitting assembly as claimed in claim 9, further comprising a light guide plate, wherein the reflection-reducing component partially overlaps the light guide plate.

12. The light-emitting assembly as claimed in claim 9, wherein the reflectivity of the reflection-reducing component is less than or equal to 85%.

* * * * *